No. 889,379. PATENTED JUNE 2, 1908.
F. LACKNER.
NUT MACHINE.
APPLICATION FILED FEB. 8, 1906.
10 SHEETS—SHEET 4.
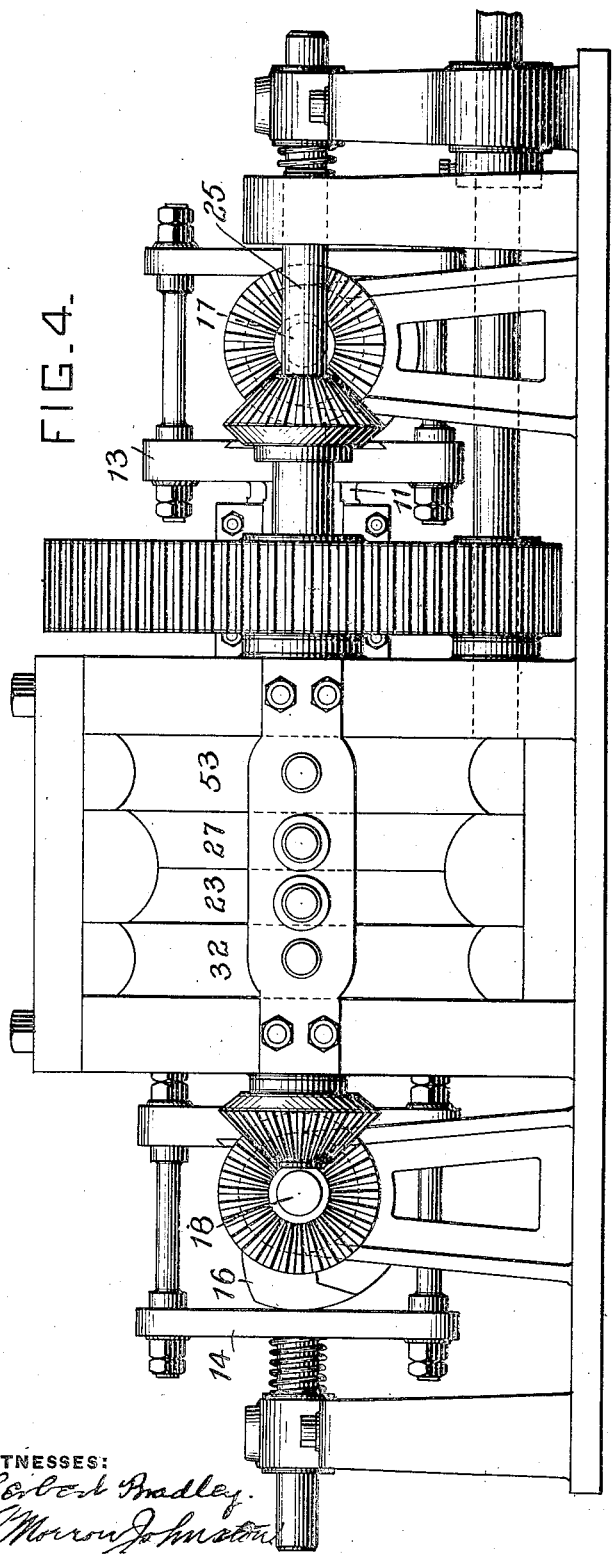
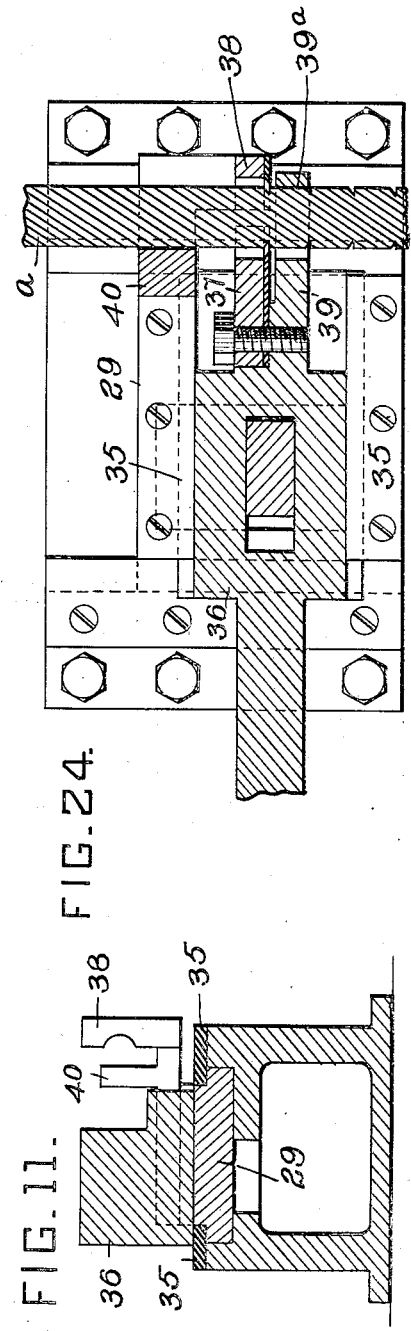
WITNESSES:
Herbert Bradley.
J. Morrow Johnston.
INVENTOR
Frederick Lackner,
by Christy & Christy, Atty's

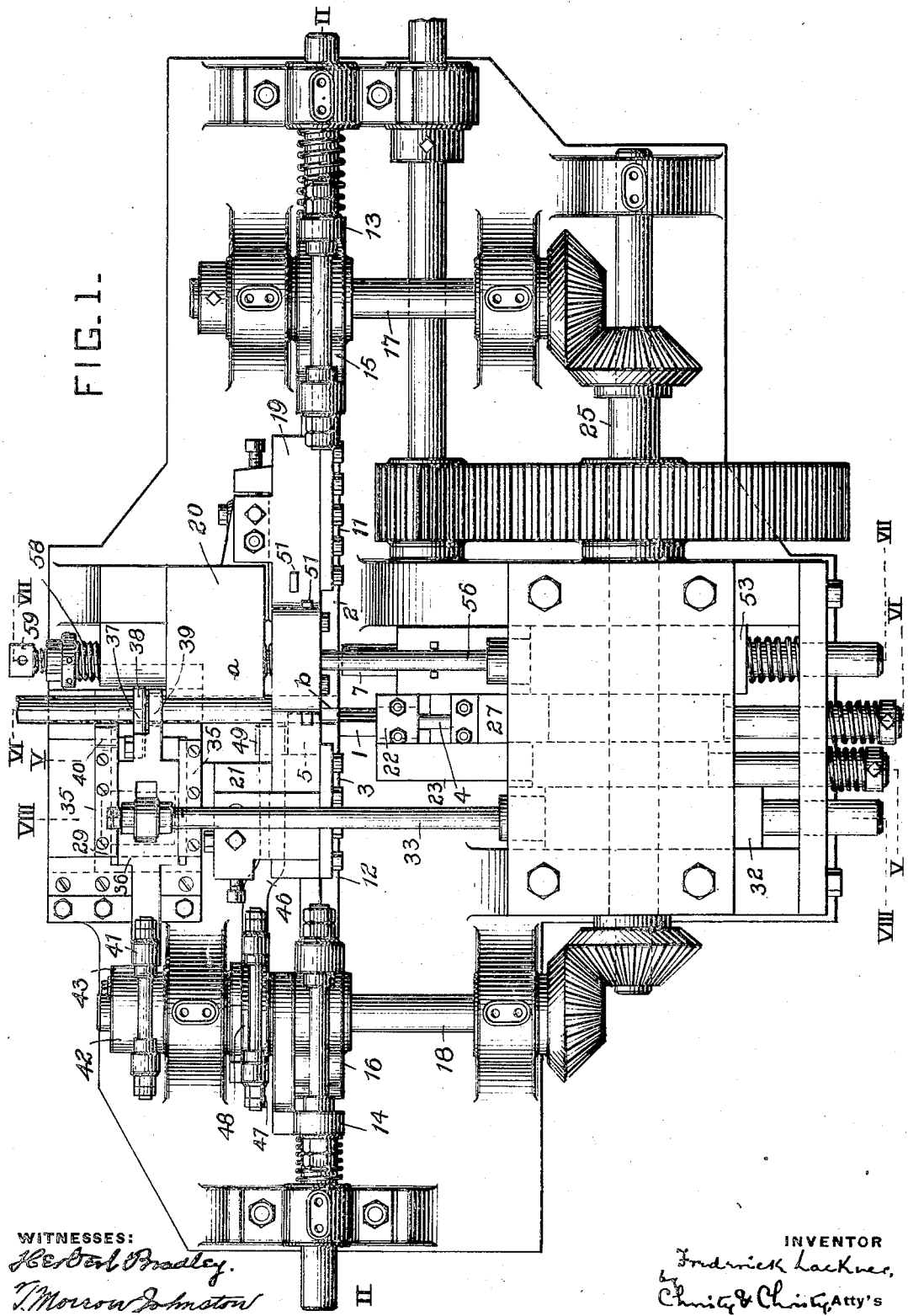

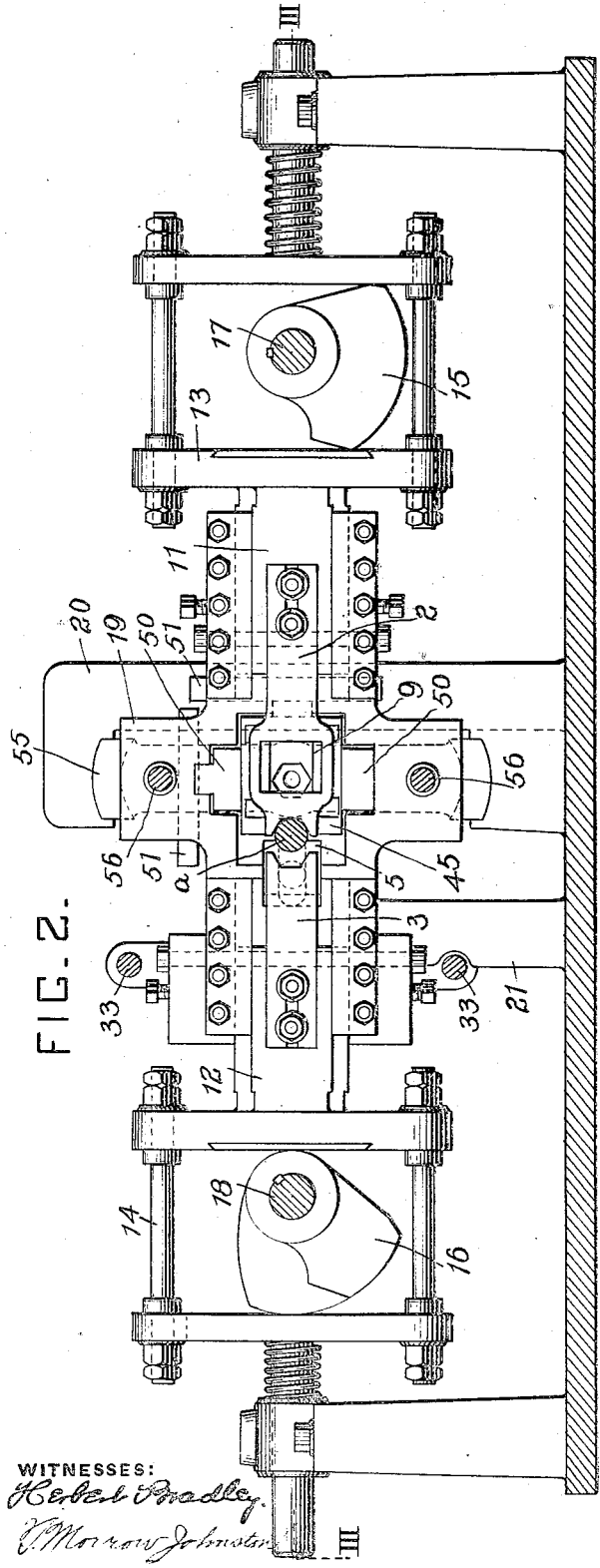
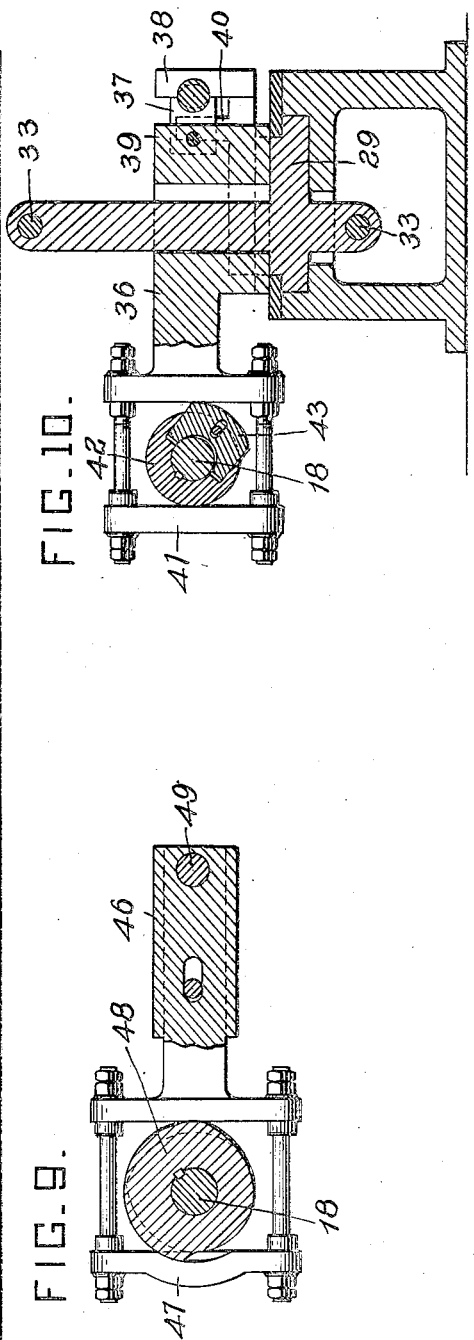

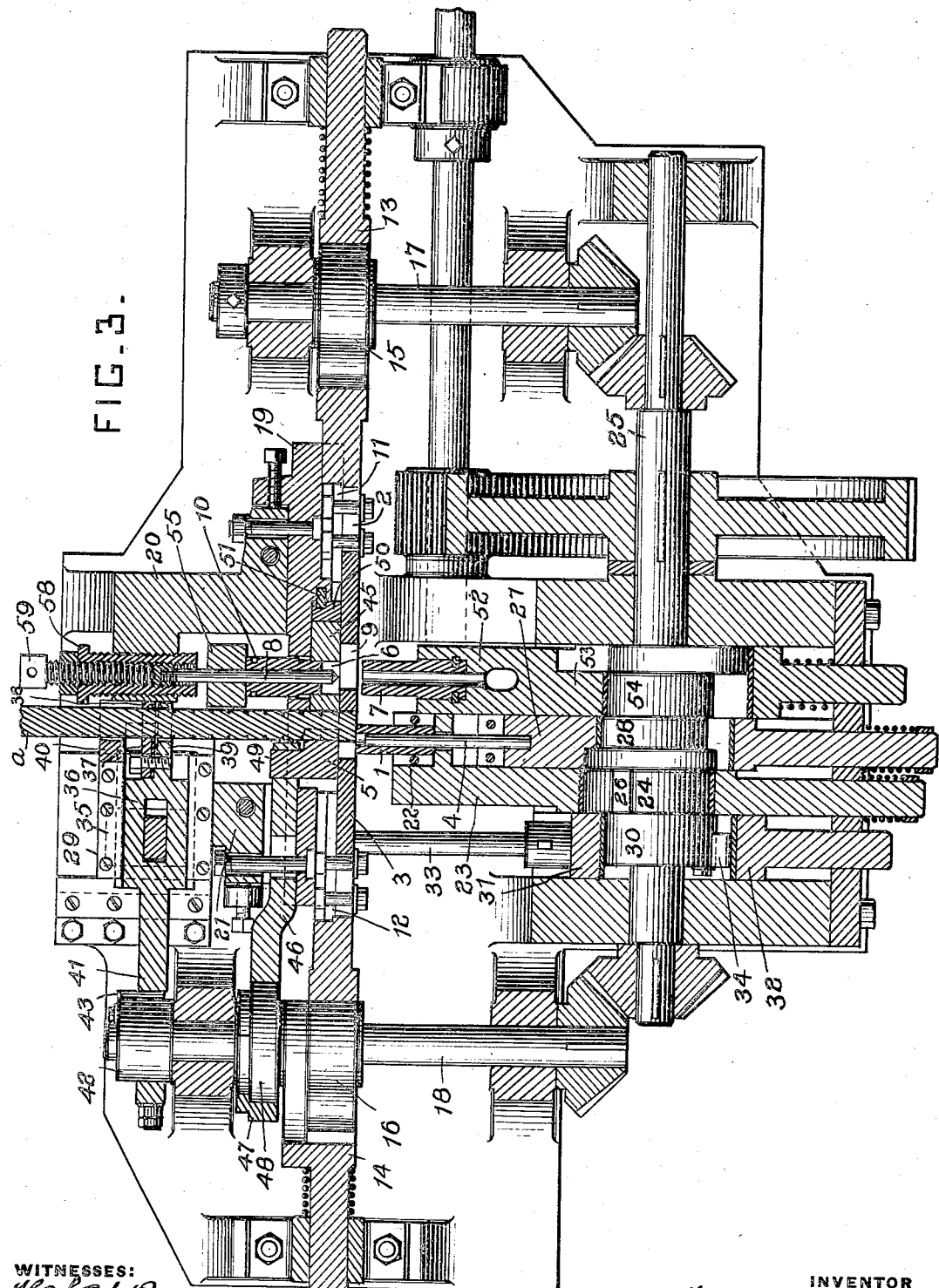

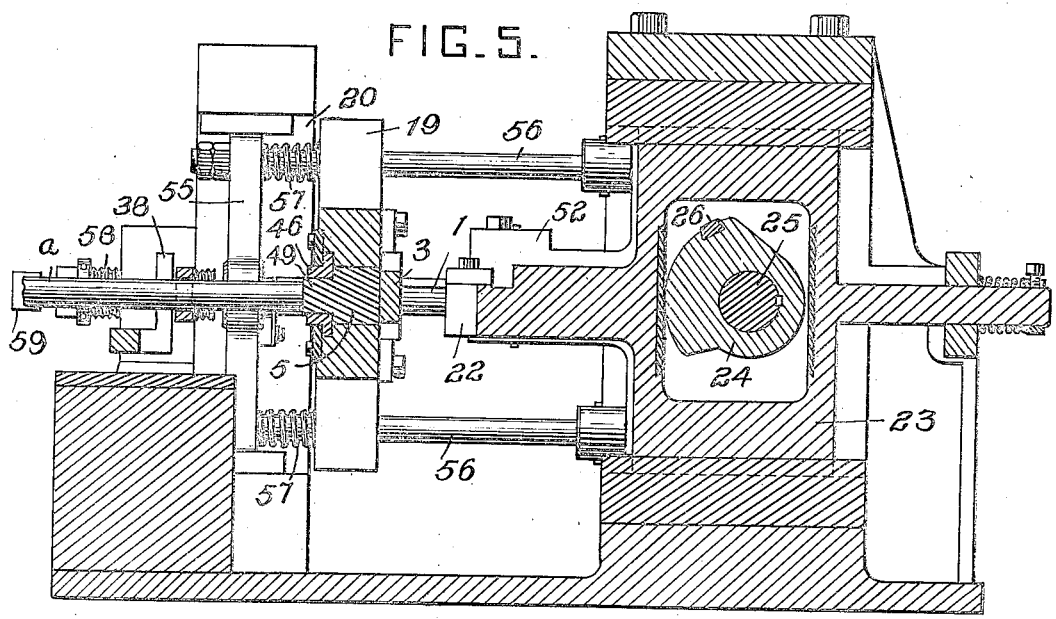
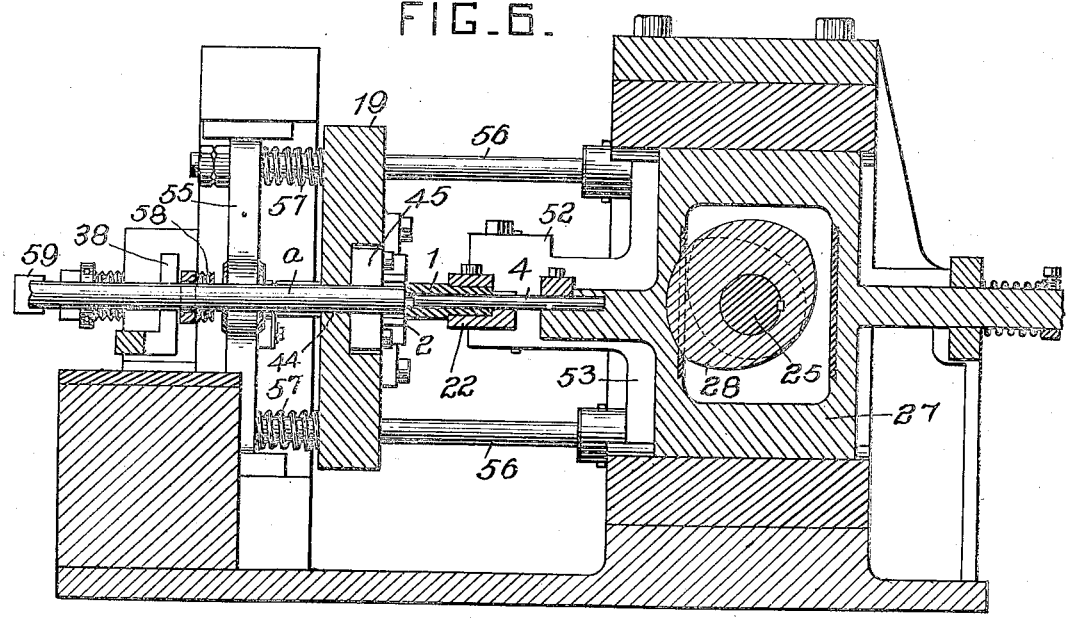

No. 889,379.

PATENTED JUNE 2, 1908.

F. LACKNER.
NUT MACHINE.
APPLICATION FILED FEB. 8, 1906.

10 SHEETS—SHEET 6.

WITNESSES:
Hebert Bradley.
S. Morrow Johnston.

INVENTOR
Frederick Lackner,
by Christy & Christy, Atty's

No. 889,379.

PATENTED JUNE 2, 1908.

F. LACKNER.
NUT MACHINE.
APPLICATION FILED FEB. 8, 1906.

10 SHEETS—SHEET 6.

WITNESSES:

INVENTOR

No. 889,379. PATENTED JUNE 2, 1908.
F. LACKNER.
NUT MACHINE.
APPLICATION FILED FEB. 8, 1906.
10 SHEETS—SHEET 9.

WITNESSES:
Herbert Bradley
T. Morrow Johnston

INVENTOR
Frederick Lackner,
by Christy & Christy, Atty's

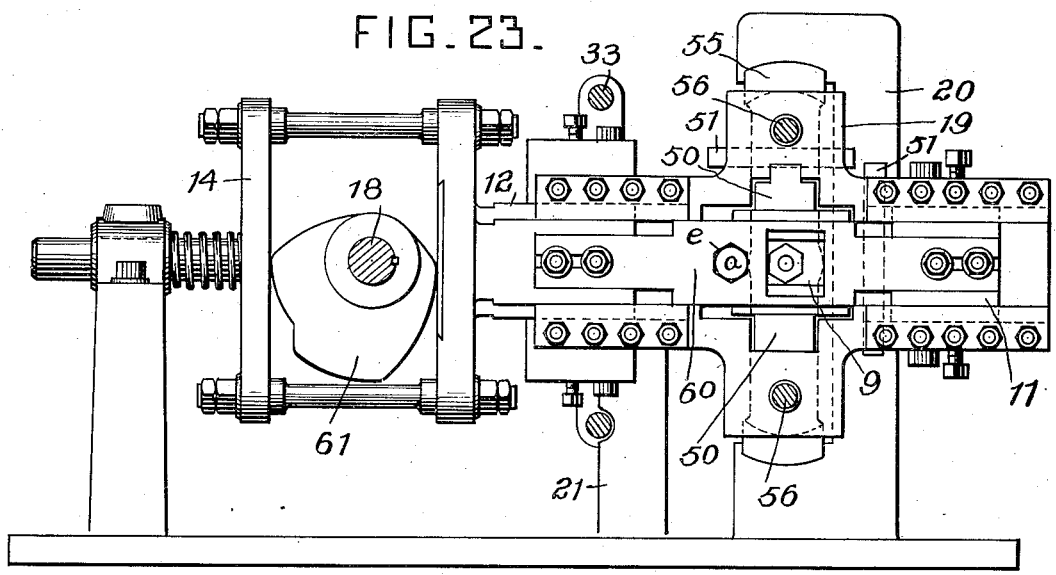

UNITED STATES PATENT OFFICE.

FREDERICK LACKNER, OF PITTSBURG, PENNSYLVANIA, ASSIGNOR TO NEELEY NUT & BOLT COMPANY, OF PITTSBURG, PENNSYLVANIA.

NUT-MACHINE.

No. 889,379.  Specification of Letters Patent.  Patented June 2, 1908.

Application filed February 8, 1906. Serial No. 300,122.

*To all whom it may concern:*

Be it known that I, FREDERICK LACKNER, residing at Pittsburg, in the county of Allegheny and State of Pennsylvania, a citizen of the United States, have invented or discovered certain new and useful Improvements in Nut-Machines, of which improvements the following is a specification.

The invention described herein relates to certain improvements in the manufacture of nuts, washers, etc., and has for its object a construction and combination of mechanism whereby a blank may be partially severed from a bar, partially punched and shaped, then completely severed from the bar and the punching and shaping completed.

The invention is hereinafter more fully described and claimed.

Figure 12:
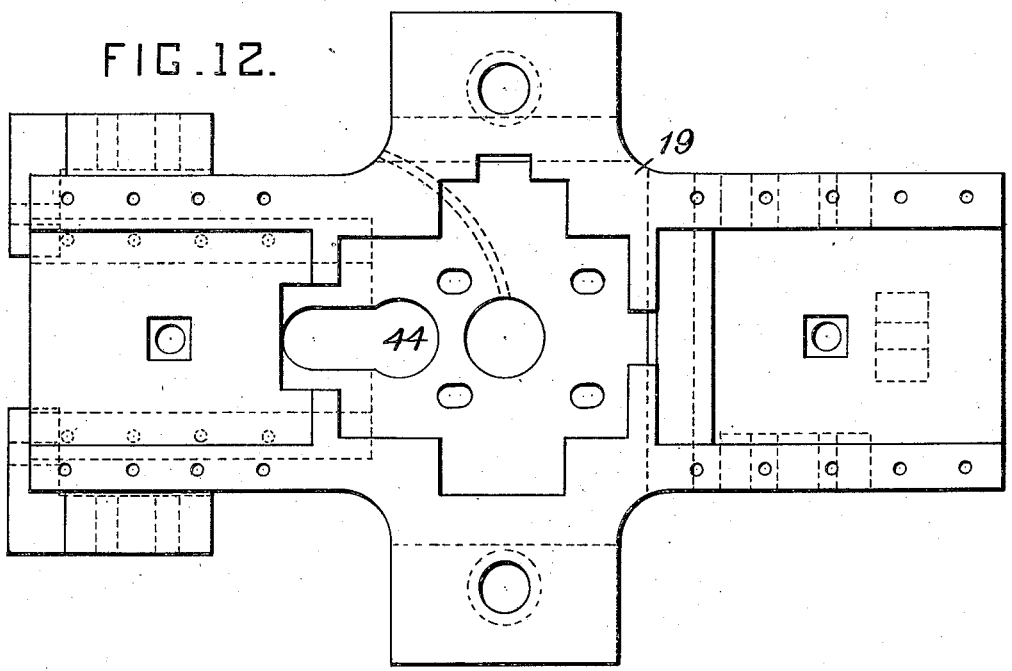
Figure 13:
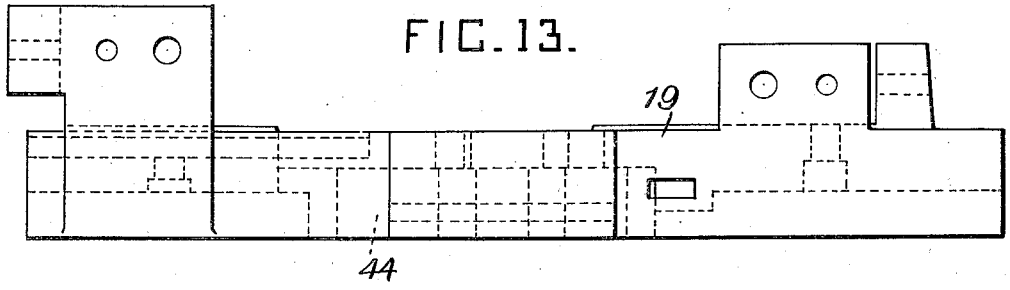
Figure 14:
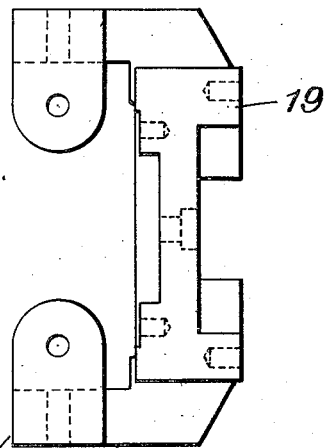

In the accompanying drawings forming a part of this specification, Figure 1 is a top plan view of my improved machine; Fig. 2 is a sectional elevation on a plane indicated by the line II—II Fig. 1; Fig. 3 is a sectional plan view on a plane indicated by the line III—III Fig. 2; Fig. 4 is a side elevation of the machine. Figs. 5, 6, 7 and 8 are transverse sections on planes indicated respectively by the lines V—V, VI—VI, VII—VII and VIII—VIII Fig. 1; Figs. 9, 10 and 11 are sectional detail views illustrative of parts of the feed mechanism; Figs. 12, 13 and 14 are views showing in plan and elevation respectively the frame carrying the shear blades and grippers directly operative upon the bar and blank; Figs. 15, 16, 17, 18, 19, 20, 21 and 22 are views showing the plan in section, the parts of the mechanism directly operative to form the nut or washer and illustrating the various steps in making the washer and the position said parts assume in such operation. Fig. 23 is a view similar to Fig. 2 illustrating a modification of my invention; Fig. 24 is a sectional plan view on an enlarged scale of the feed mechanism.

Figure 15:
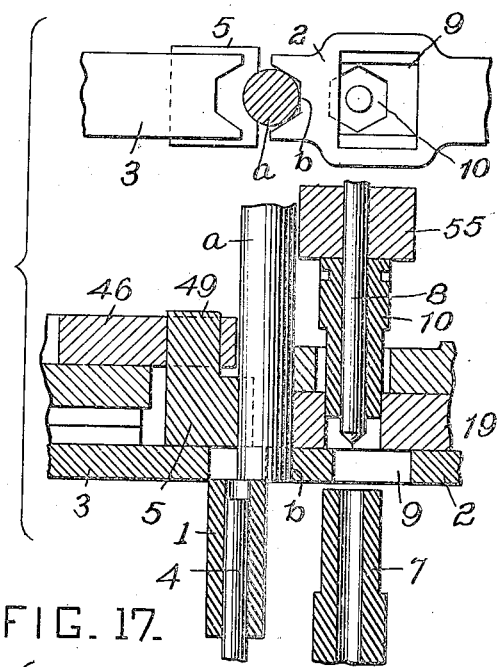
Figure 16:
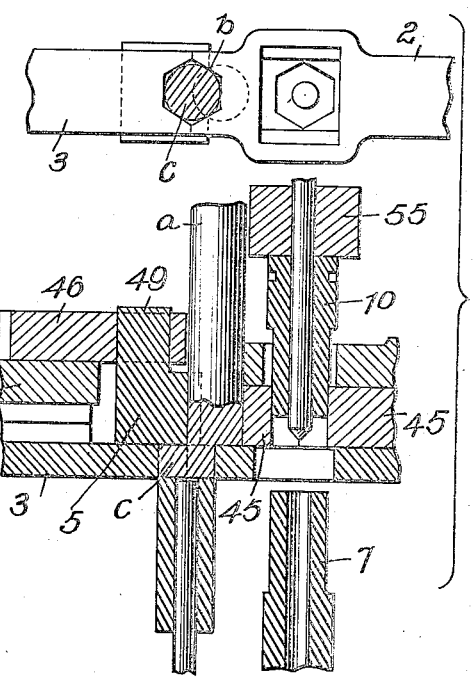

In the practice of my invention the bar, $a$, is fed forward by mechanism hereinafter described against a movable stop 1, the position of said stop being eccentric to the axis of the bar when being fed as shown in Fig. 15. As soon as the end of the bar comes in contact with the stop, the slide 2 having a shear edge, $b$, is moved forward to the left in Fig. 1 partially severing the end portion of the bar $a$ as shown in Fig. 16. By this partial severing and simultaneous lateral movement of the partially severed section $c$, the latter is moved against the end of a slide 3 as shown in Fig. 16.

Figure 17:
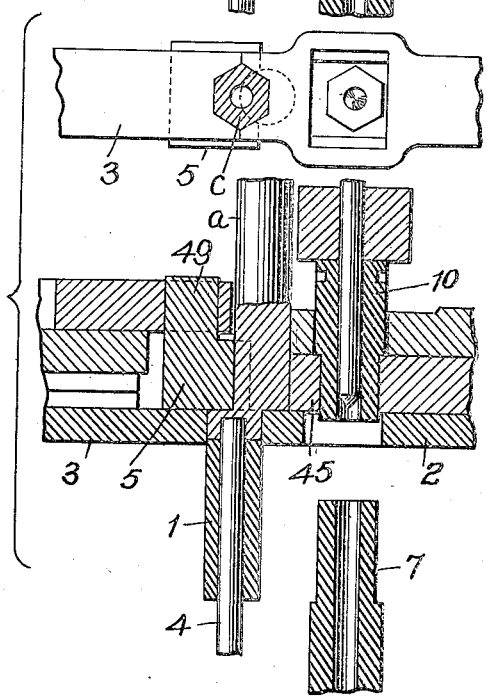

It will be observed by reference to Figs. 15 and 16 that the operative ends of the slides 2 and 3 are recessed or provided with matrices corresponding to the cross sectional shape of the nut to be produced, and that when the slide 2 is shifted as above stated to the left, these two notches or recesses form a complete matrix corresponding or approximately corresponding in shape and dimensions to the nut to be produced. When the portion $c$ has been partially severed and shifted as shown in Figs. 16 and 17, a punch 4 is moved forward through the movable stop 1, thereby partially perforating the portion $c$. It will be observed that in this punching operation the portion $c$ is backed up in part at least by the rod $a$, the axis of the punch while eccentric to the axis of the rod, is in line or approximately in line with the surface of the bar or may be slightly within the perimeter thereof. In addition to the support thus furnished by the end of the bar $a$ the portion $c$ is also supported during this punching operation by the movable gripping member 5 which is operated as hereinafter described.

Figure 18:
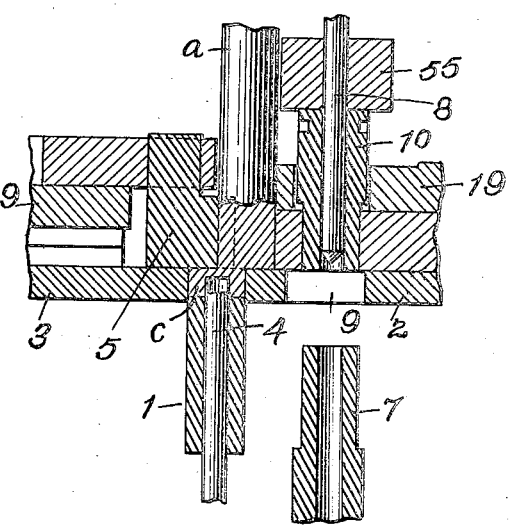
Figure 19:
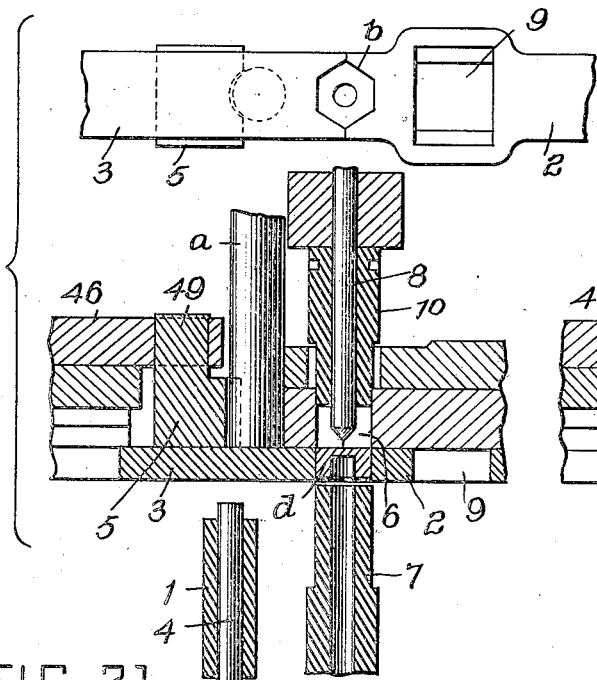
Figure 20:
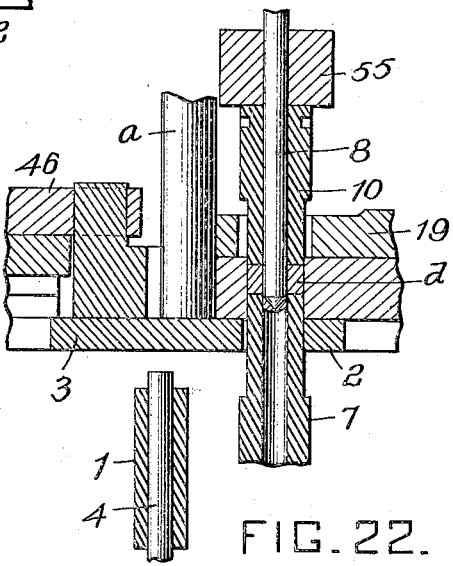
Figure 21:
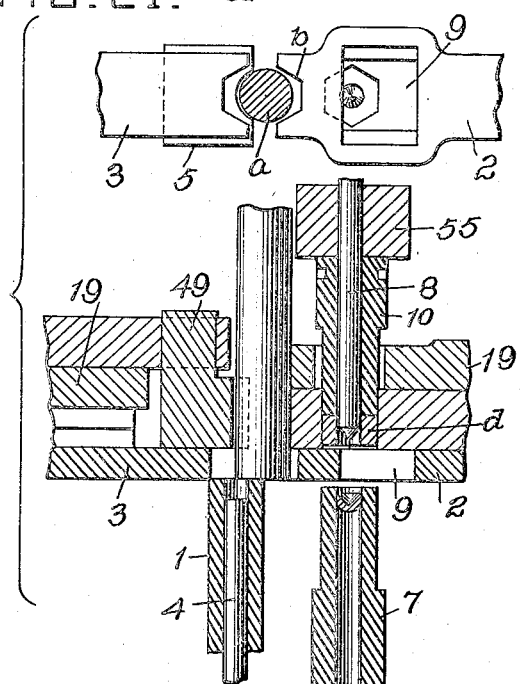
Figure 22:
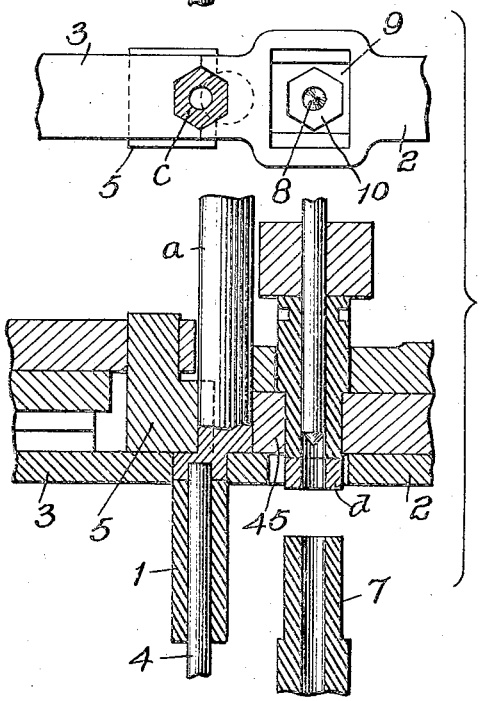

After the punch 4 has completed its forward movement, the movable stop is given a slight inward movement so as to partially compress and laterally spread the portion $c$ causing it to completely fill the matrix in the slides 2 and 3, if the prior punching operation has not affected that purpose, as shown in Figs. 17 and 18. After the withdrawal of the punch and plunger the slides 2 and 3 are moved to the right as shown in Fig. 19 thereby effecting a complete severance of the portion $c$ from the rod and its transfer into line with the final shaping matrix 6. As soon as the slides have reached the position shown in Fig. 19 a plunger 7 is moved forward, forcing the blank $d$ from between the blades or slides 2 and 3, and into the shaping matrix 6. By this movement of the plunger and blank the thin wall left by the partial punching operation previously described, is removed, the blank being forced over a stationary punch 8 having its operative portion arranged within the matrix 6. The metal removed by this punching operation is forced into an opening or passage through the plunger 7. In addition to thus completing the punching operation, the plunger 7 is giva en sufficient movement to effect a complete and final shaping of the blank, as shown in Fig. 20. The plunger 7 is now withdrawn and the slide 2 is moved to the left, the slide 3 having been moved to the left during the operation of the plunger 7. In this movement of the slide 2 its shearing and partial shaping edge comes in contact with the end portion of the bar $a$ which has been fed forward against the movable stop 1, subsequent to the movement of the slide 3 to the left. The movement of the slide 2 continues thereby partially severing the end portion of the bar, and forcing such partially severed portion against the shaping portion of the slide 3 as heretofore described. During this movement of the slide 2 to the left an opening 9 in the slide in the rear of its shaping edge, is brought into line with the matrix 6 and the previously-shaped or finished nut is forced out of said matrix through the opening 9 in the slide 2 by a plunger 10 whose inner end forms the back wall of the shaping matrix and through which the punch 8 extends.

Having thus described the operation of the several parts directly operative upon the bar and blank to produce a nut or washer, I will now describe the mechanism whereby these parts are properly shifted to effect the desired result. The slides 2 and 3 are adjustably secured as shown in Fig. 2, to the heads 11 and 12 secured to yokes 13 and 14 surrounding the cams 15 and 16 on the shafts 17 and 18, which are rotated in any suitable manner known in the art. These cams are so constructed that the slide 3 will move to the left in advance of the slide 2 and will then rest until the slide 2 has been moved forward as heretofore described to effect the partial shearing of the end portion of the bar. After this partial shearing has been effected the slide 3 will remain stationary and the slide 2 will come to a rest both slides being stationary during the partial punching and shaping effected by the punch 4 and plunger or stop 1. The cams 15 and 16 will then operate in unison to move the slides 2 and 3 to the right thereby completely severing the portion $c$ from the bar and carrying the blank into line with the matrix 6. The cams then hold the slides in this position until the plunger 7 has moved forward forcing the blank from between the slides and into the shaping matrix. The cam 16 will then shift the slide 3 back to its position to the left and the cam 15 will hold the slide 2 stationary until the punch 7 has moved inward and returned to the position shown in Figs. 16, 17 18, 21 and 22, when the cam 15 will again shift the slide 2 to the left. The blocks 11 and 12 are mounted in suitable guideways in a frame 19 shown in Figs. 1, 2, 12, 13 and 14, which is adjustably secured as indicated to upwardly projecting portions 20 and 21 on the bed of the machine. By reference to Figs. 2 and 3 it will be seen that although I have described the cam 16 as a single cam, it is preferred to form the same in two independent sections for convenience in the manufacture and adjustment.

The plunger 1 is secured in a head 22 carried by the sliding block 23 suitably recessed to form a yoke for the cam 24 on the shaft 25, as shown in Fig. 5. It will be observed that this cam is constructed to give the desired back and forth movements whereby the plunger is placed in position to operate as a stop for the movement of the bar $a$ and shifted away from such position and is also provided with a small projection 26 whereby the slight inward movement is given to the plunger to effect the compression of the portion $c$ after it has been partially punched as heretofore described.

The punch 4 which as heretofore stated operates through the plunger 1 is secured to a sliding block 27 mounted in suitable ways in the bed of the machine and constructed to form a yoke for the cam 28 on the shaft 25, as shown in Fig. 6.

Figure 7:
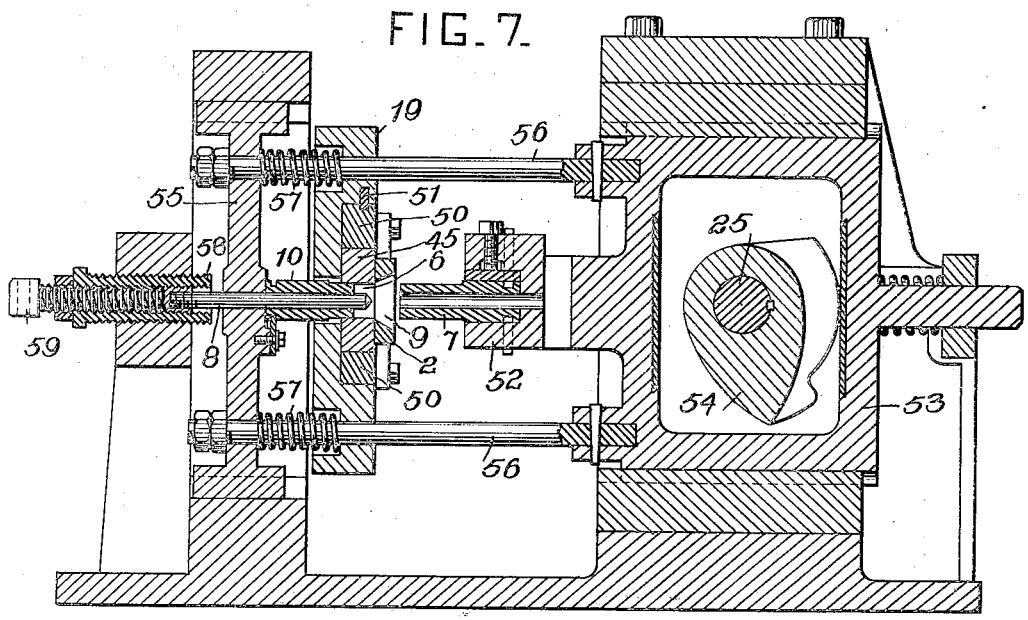
Figure 8:
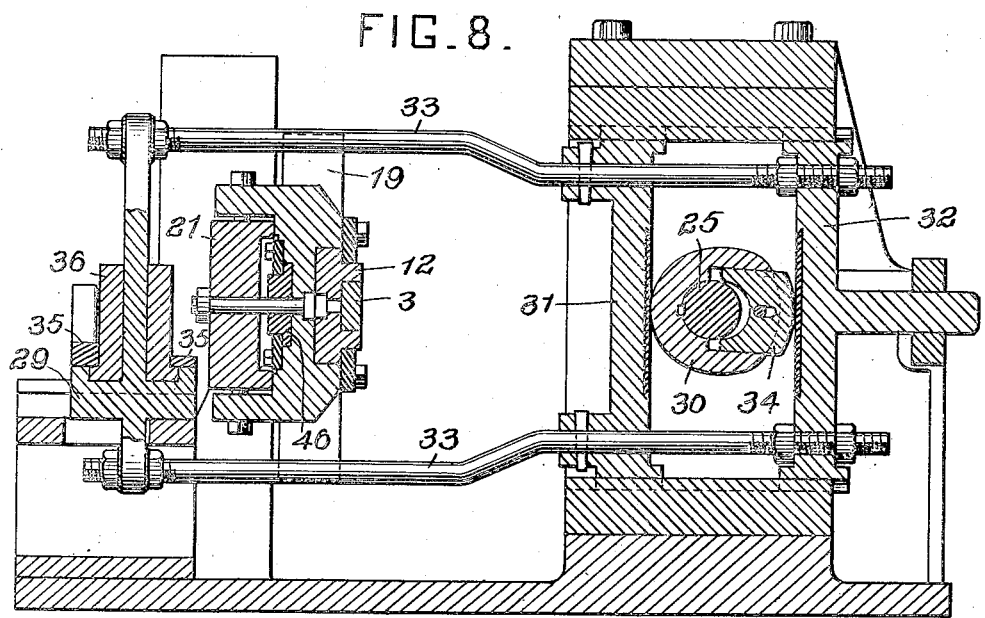

The feed mechanism for shifting the rod consists of a gripping device hereinafter described, mounted upon a slide 29 arranged in suitable ways in the bed of the machine, and adapted to be moved back and forth by means of a cam 30 on the shaft 25, operating within a yoke consisting of members 31 and 32, and connected by rods 33 to the slide 29, as clearly shown in Fig. 8. The cam 30 is provided with an adjustable section 34 and one of the members of the yoke as 32, is adjustable towards and from the other member on the rod 33 so as to permit an adjustment or regulation of the amount of feed imparted to the rod $a$ dependent upon the dimensions of the nut or washer to be produced. The slide 29 is provided with suitable guide-ways 35 for the slide 36, carrying movable gripping member 37. The stationary gripping member 38 is secured to or formed on the slide 29 as shown in Fig. 11. In order to insure a firm engagement of the gripping devices with the bar or rod $a$ it is preferred that the blades should be secured to the members 37 and 38 of the grippers, so that they will bite into the bar or rod when a feed is desired. By reference to Figs. 1, 3 and 10 it will be seen that the gripper 37 is secured to an extension 39 of the slide, having an enlarged slot therein for the passage of the bar $a$. When it is desired to release the bar from the grippers the slide 36 is moved to the left thereby bringing a portion, 39ª, of the wall of the slot in the member 39 against the bar or rod and shifting it so as to release it from the blade of the member 38 on the gripper. In case the bar or rod should follow the member 37 in its movement to the left, it will be drawn against a stop 40 on the slide 29 and prevented from further movement with the member 37, thus releasing the latter from the rod. The slide 36 is formed on or connected to a yoke 41 in which operates a cam 42 on the shaft 18, said cam having an adjustable section 43 to permit of the use of the grippers in connection with bars varying in diameter.

When the bar or rod is fed forward, it passes through an opening 44 in the frame 19 and in order to hold the portion of the bar or rod adjacent to the part to be severed therefrom, suitable gripping mechanism is employed consisting of a plate 45 secured within a recess in the frame 19 and a movable gripping member 5 carried by a slide 46 movable in ways in the frame 19. This slide is connected to or formed on a yoke 47 in which operates a cam 48 on the shaft 18, as shown in Figs. 3 and 9. While the gripping block 5 may be secured to the slide 46 in any suitable manner, it is preferred that it should be formed with a lug 49 projecting through an opening in the slide as shown. The plate 45 which has formed therein the final shaping matrix 6 is adjustably secured within the frame 18 by means of blocks 50 and wedges 51 as shown in Figs. 2 and 3.

The plunger 7 is secured in a head 52 formed on or secured to a yoke 53 mounted in suitable ways on the bed of the machine and inclosing a cam 54 on the shaft 25, whereby the plunger is moved towards and partially into the matrix 6 as shown in Fig. 20, forcing in its movement, the blank from between the blades 2 and 3 as heretofore described. A slide 55 mounted in ways in the bed of the machine is connected by rods 56 to the yoke so as to be moved thereby. It will be observed by reference to Fig. 7 that when the yoke moves to the left to force the plunger into the matrix, motion will be communicated to the slide 55 through springs 57, whereby the slide will be moved against an adjustable stop 58 and that thereafter the movement of the plunger and yoke will be independent of the slide, the compression of the springs permitting of such independent movement. To the slide is secured the block 10 whose inner end forms the back wall of the matrix 6. By the primary movement of the yoke this block 10 is drawn to proper position in the matrix and is held from further movement by the stop 58. When the yoke moves to the right the plunger 7 will be first withdrawn from the matrix and thereafter the slide and block will move with the plunger thus forcing the completed nut out of the matrix and through the opening 9 in the blade 2. It will be observed that the cam 54 is so constructed as to permit the yoke and parts operated thereby to rest after the plunger has been withdrawn from the matrix, thus affording time for the slide 2 to be shifted as heretofore stated to bring the opening 9 into alinement with the matrix. The punch 8 is secured to a screw 59 passing through the stop 58. In Fig. 23 I have shown a certain modification of my machine in which the slides 2 and 3 are formed integral with each other and the preliminary shaping matrix formed in the edges, the construction heretofore described of the slides being made with integral walls in single slide 60. In this construction a single cam 61 on the shaft 18 is employed, said cam being suitably constructed to impart the desired motions to the slide 60. This cam should be constructed to allow the slide to remain stationary while the plunger 7 operates and then moved to the left after the withdrawal of the plunger to bring the preliminary shaping matrix $e$ into alinement with the rod $a$. After the slide reaches this position the rod or bar is fed forward and the slide again shifted to the left to partially sever the end portion of the bar, thus bringing the partially severed portion and the preliminary matrix into line with the plunger and a punch 4. The slide is now allowed to rest during the operation of the plunger and punch and is then shifted to the right to bring the blank into line with the final shaping matrix 6.

I claim herein as my invention;

1. In a machine for the manufacture of nuts, washers, etc., the combination of means for partially severing a portion of a bar or rod, means for partially punching the partially severed portion, means for completing the severance of the partially punched portion, means for completing the punching of the severed portion and means for compressing and finally shaping the punched blank.

2. In a machine for the manufacture of nuts, washers, etc., the combination of means for holding the bars against lateral movement two slides, having their adjacent ends recessed to form an inclosing matrix, means for shifting one of said slides transversely of the bar and toward the other end to partially sever the bar and inclose the partially severed portion and means for simultaneously shifting both slides in reversal of the movement of the first slide thereby completely severing the bar or rod.

3. In a machine for the manufacture of nuts, washers, etc., the combination of a lateral support for a bar, a matrix, a punch, means for shifting said matrix in one direction to partially sever a bar or rod and bring the partially severed section into line with the punch, and means for shifting the matrix in the opposite direction to complete the severance of the bar or rod.

4. In a machine for the manufacture of nuts, washers, etc., the combination of a lateral support for the bar, a matrix, means for feeding a bar or rod into said matrix, a punch and plunger arranged eccentric to the line of feed of the bar or rod, means for shifting the matrix in one direction into alinement with the punch and plunger, means for operating punch and plunger and means for shifting the matrix in a reverse direction.

5. In a machine for the manufacture of nuts, washers, etc., the combination of a lateral support for a bar or rod, a matrix, means for feeding a bar or rod into said matrix in one direction to partially sever the bar or rod and bring the partially severed portion into alinement with the punch, a shaping matrix, means for shifting the movable matrix in the opposite direction into alinement with the shaping matrix, a punch extending into said matrix, and a compressing plunger and means for reciprocating said plunger.

6. In a machine for the manufacture of nuts, washers, etc., the combination of mechanism for feeding a bar or rod, a movable plunger arranged eccentric to the axis of the bar or rod while being fed, a slide, means for moving the slide transversely of the line of feed of the bar whereby a portion of the bar is partially severed and forced laterally into alinement with the plunger, a punch for partially perforating the partially severed portion, means for operating the punch, and means for imparting a compressing movement to the plunger.

7. In a machine for the manufacture of nuts, washers, etc., the combination of mechanism for feeding a bar or rod, a shaping matrix, a punch projecting into said matrix, a plunger in line with said matrix, a lateral support for the bar, a movable matrix, means for moving said movable matrix transversely of the line of feed of the bar or rod whereby a portion of the bar is partially severed and moved laterally, means for moving the matrix in an opposite direction whereby the partially severed portion is detached from the bar and moved into position between the shaping matrix and the plunger.

8. In a machine for the manufacture of nuts, washers, etc., the combination of a matrix, means for feeding a bar or rod into said matrix, means for gripping the bar or rod, a punch and a plunger arranged eccentric to the line of feed of the bar or rod, means for shifting the matrix in one direction in alinement with the punch or plunger, means for operating the punch and plunger, and means for shifting the matrix in the reverse direction.

9. In a machine for the manufacture of nuts, washers, etc., the combination of a matrix, means for feeding a bar or rod into said matrix, a lateral support for the bar a punch and plunger arranged eccentric to the line of feed of the bar or rod, means for shifting the matrix in a direction to partially sever the bar or rod, and bringing the partially severed portion into alinement with the punch and plunger, means for operating the punch, means for imparting an inward movement to the plunger, a shaping matrix, means for shifting the movable matrix into line with the shaping matrix, a punch projecting into said matrix, a hollow plunger in line with said matrix, and means for operating the plunger.

10. In a machine for the manufacture of nuts, washers, etc., the combination of mechanism for feeding a bar or rod, a shaping matrix, a punch projecting into said matrix, a plunger in line with said matrix, a slide, means for moving said slide transversely of the line of feed of the bar or rod, whereby a portion of the bar is partially severed and moved laterally, a second slide, means for moving both slides in reversal of the movement of the first slide whereby the partially severed portion is detached from the bar, and moved into position between the shaping matrix and plunger.

In testimony whereof, I have hereunto set my hand.

FREDERICK LACKNER.

Witnesses:
CHARLES BARNETT,
HERBERT BRADLEY.